(12) United States Patent
Itoi et al.

(10) Patent No.: US 8,507,119 B2
(45) Date of Patent: Aug. 13, 2013

(54) BATTERY BLOCK AND BATTERY MODULE

(75) Inventors: Toshiki Itoi, Nara (JP); Shinya Geshi, Osaka (JP); Yoshiaki Kobayashi, Osaka (JP); Takashi Nakagawa, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/496,398

(22) PCT Filed: May 17, 2011

(86) PCT No.: PCT/JP2011/002737
§ 371 (c)(1),
(2), (4) Date: Mar. 15, 2012

(87) PCT Pub. No.: WO2012/035683
PCT Pub. Date: Mar. 22, 2012

(65) Prior Publication Data
US 2012/0231309 A1    Sep. 13, 2012

(30) Foreign Application Priority Data
Sep. 17, 2010  (JP) .................................. 2010-208899

(51) Int. Cl.
*H01M 2/10* (2006.01)
(52) U.S. Cl.
USPC ............................................ 429/99; 429/151
(58) Field of Classification Search
USPC ............................ 429/99, 120, 151, 148, 159
See application file for complete search history.

(56) References Cited

U.S. PATENT DOCUMENTS

| | | | |
|---|---|---|---|
| 6,379,837 B1* | 4/2002 | Takahashi et al. | 429/151 |
| 2002/0125860 A1 | 9/2002 | Schworm et al. | |
| 2004/0043287 A1 | 3/2004 | Bando et al. | |
| 2005/0079408 A1 | 4/2005 | Hirano | |
| 2007/0009787 A1 | 1/2007 | Straubel et al. | |

(Continued)

FOREIGN PATENT DOCUMENTS

| | | |
|---|---|---|
| CN | 1592977 A | 3/2005 |
| DE | 101 45 064 A1 | 4/2003 |

(Continued)

OTHER PUBLICATIONS

Extended European Search Report dated Jul. 4, 2012 issued in corresponding EP Patent Application No. 11824703.0-1227.

(Continued)

*Primary Examiner* — Mark F Huff
*Assistant Examiner* — Monique Wills
(74) *Attorney, Agent, or Firm* — McDermott Will & Emery LLP (57) ABSTRACT

A battery block includes a metal case including a side surface and a bottom surface, and a plurality of cells accommodated in the metal case, wherein each cell includes a first electrode and a second electrode which is electrically insulated from the first electrode, and also serves as a cell case of the cell, the plurality of cells are aligned with the first electrodes being in a same direction, the first electrodes of the plurality of cells are connected to a connector arranged to face an opening of the metal case, the second electrodes of the plurality of cells are connected to the bottom surface of the metal case, the height of the side surface of the metal case is substantially the same as the height of the cells, and the opening of the metal case is almost completely covered with the connector.

17 Claims, 13 Drawing Sheets

(a)

(b)

(56) References Cited

U.S. PATENT DOCUMENTS

| | | | |
|---|---|---|---|
| 2008/0003491 A1* | 1/2008 | Yahnker et al. | 429/62 |
| 2009/0214940 A1* | 8/2009 | Haussmann | 429/120 |
| 2010/0047676 A1* | 2/2010 | Park et al. | 429/93 |
| 2011/0195284 A1 | 8/2011 | Yasui et al. | |
| 2011/0206978 A1* | 8/2011 | Muis | 429/158 |

FOREIGN PATENT DOCUMENTS

| | | |
|---|---|---|
| EP | 1 237 209 A1 | 9/2002 |
| EP | 1 450 422 A | 8/2004 |
| JP | 2001-006639 A | 1/2001 |
| JP | 2001-155702 | 6/2001 |
| JP | 2001-256949 | 9/2001 |
| JP | 2003-162993 A | 6/2003 |
| JP | 2003-331807 A | 11/2003 |
| JP | 2004-171856 | 6/2004 |
| JP | 2006-100146 | 4/2006 |
| JP | 2007-280679 A | 10/2007 |
| JP | 2008-541386 | 11/2008 |
| JP | 2010-140695 A | 6/2010 |
| WO | WO 03/047013 A1 | 6/2003 |
| WO | WO 2010/067602 A1 | 6/2010 |

OTHER PUBLICATIONS

International Search Report issued in International Patent Application No. PCT/JP2011/002737, filed on May 17, 2011.

* cited by examiner

BATTERY BLOCK AND BATTERY MODULE

RELATED APPLICATIONS

This application is the U.S. National Phase under 35 U.S.C. §371 of International Application No. PCT/JP2011/02737, filed on May 17, 2011, which in turn claims the benefit of Japanese Application No. 2010-208899, filed on Sep. 17, 2010, the disclosures of which Applications are incorporated by reference herein.

TECHNICAL FIELD

The present invention relates to battery blocks including a plurality of cells connected to each other in parallel to output a large current, and to battery modules including the battery blocks.

BACKGROUND ART

In recent years, in view of savings in resources and conservation of energy, there have been increasing demands for nickel-hydrogen secondary batteries, lithium ion secondary batteries, etc. which can be used repeatedly. Among them, lithium ion secondary batteries are characterized by lightness in weight, high electromotive force, and high energy density. Thus, there are growing demands for the lithium ion secondary batteries as power sources for driving various kinds of portable electronic devices and mobile communication devices such as mobile phones, digital cameras, video cameras, and lap top computers.

On the other hand, to reduce used amount of fossil fuel, and to reduce the amount of emission of $CO_2$, expectations for secondary batteries are growing to serve as power sources for driving motors such as vehicles.

A battery pack which is a set of such secondary batteries includes a plurality of batteries in order to obtain a preferable voltage and battery capacity, and has a configuration in which a plurality of battery blocks are provided, where each battery block includes the plurality of batteries connected to each other in parallel and/or in series. Such a battery block is described in, for example, Patent Document 1.

CITATION LIST

Patent Document

PATENT DOCUMENT 1: Japanese Translation of PCT International Application No. 2008-541386

SUMMARY OF THE INVENTION

Technical Problem

When a battery block including a plurality of batteries connected to each other in parallel is used as, for example, a power source for driving a motor of a vehicle, a large current flows through the batteries. Therefore, if electrical connection between the batteries is not ensured, no current may flow, or the resistance at a contact may increase, thereby generating heat, which inhibits flow of the large current. For this reason, not only bringing the batteries into contact with a connection member, but also ensuring good electrical connection by, for example, welding are required.

For example, when the connection member is connected to the batteries by welding, a welding method which can ensure high mechanical strength at welding sections has to be selected in view of materials, structures, and the like of negative electrode terminals (e.g., battery cases) and positive electrode terminals of the batteries and the connection member. In contrast, to reduce the electrical resistance of the connection member, the thickness and the width of the connection member have to be increased.

However, when the thickness and the width of the connection member are increased, the connection member occupies spatially large volume, so that the size and/or the weight of the battery block may be increased. In particular, when the battery block is used as a power source for driving a motor of a vehicle, the battery block has to be light in weight and small in size in order to extend the range. Thus, heavy big battery blocks have no commercial value.

In view of the foregoing, the present invention was devised. It is an objective of the invention to provide a battery block including a plurality of batteries connected to each other in parallel, wherein electrical resistance is small, and power loss is small even when a large current flows through the batteries.

Solution to the Problem

To solve the problems discussed above, an example battery block of the present invention includes: a metal case including a side surface and a bottom surface; and a plurality of cells accommodated in the metal case, wherein each cell includes a first electrode and a second electrode which is electrically insulated from the first electrode, and also serves as a cell case of the cell, the plurality of cells are aligned with the first electrodes being in a same direction, the first electrodes of the plurality of cells are connected to a connector arranged to face an opening of the metal case, the second electrodes of the plurality of cells are connected to the bottom surface of the metal case, a height of the side surface of the metal case is substantially the same as a height of the cells, and the opening of the metal case is almost completely covered with the connector.

With this configuration, a current from the second electrode (cell case) can be output to the metal case having a large cross-sectional area, so that it is possible to obtain a battery block having a large cross-sectional area and having small electrical resistance.

Advantages of the Invention

According to the present invention, it is possible to provide a battery block including a plurality of batteries connected to each other in parallel, wherein the electrical resistance is small, and power loss is small even when a large current flows through the batteries.

BRIEF DESCRIPTION OF THE DRAWINGS

FIGS. 1A, 1B are views illustrating a configuration of a battery module of an embodiment of the present invention, wherein

FIGS. 13A, 13B, 13C are views illustrating still another variation of the metal case, where

DESCRIPTION OF EMBODIMENTS

Embodiments of the present invention will be described in detail below with reference to the drawings. In the drawings to follow, like reference numbers are used to designate elements having substantially the same function for the sake of brevity. The present invention is not limited to the embodiments below.

Figure 1:
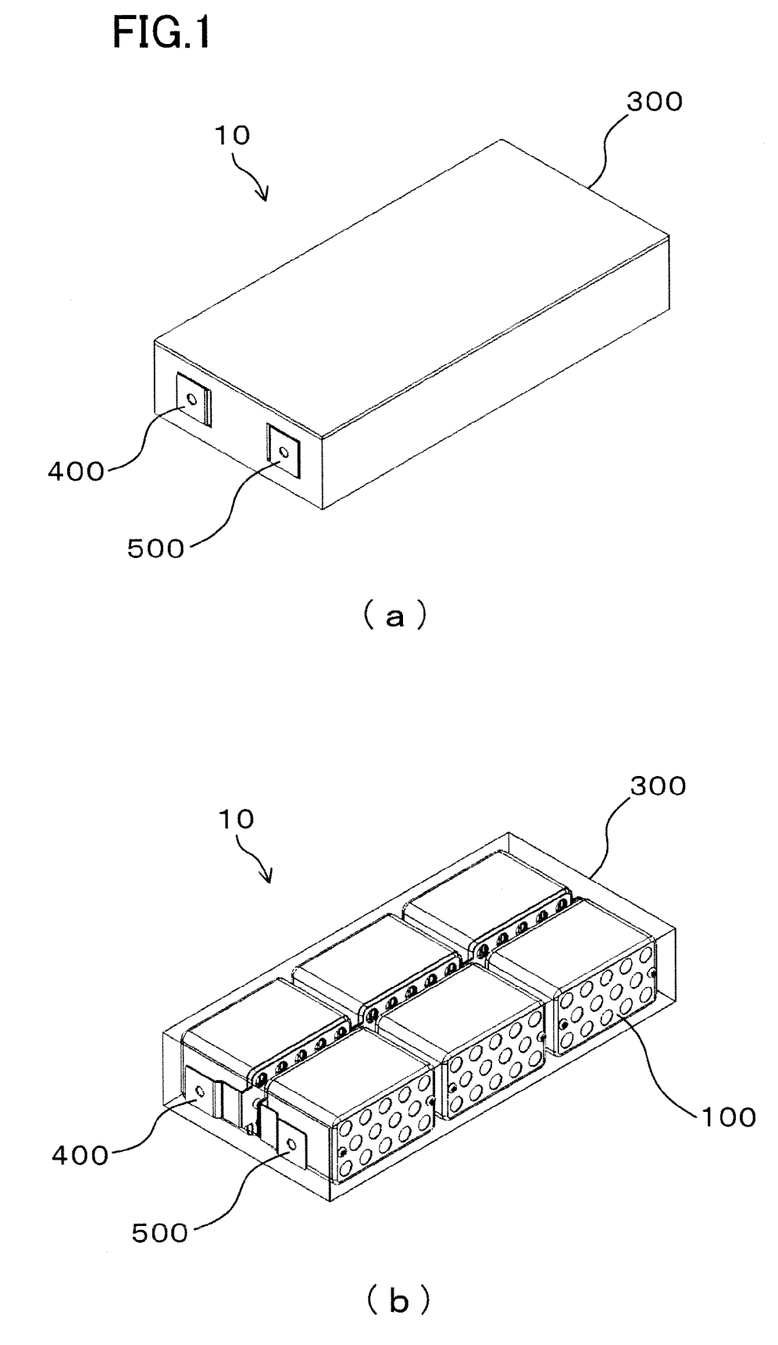
FIG. 1A is a perspective view.
FIG. 1B is a transparent view of the housing of FIG. 1A.

FIGS. 1A, 1B are views illustrating a configuration of a battery module 10 of an embodiment of the present invention, where FIG. 1A is a perspective view, and FIG. 1B is a transparent view of the housing of FIG. 1A.

As illustrated in FIG. 1B, the battery module 10 includes a set of six battery blocks 100, wherein three battery blocks 100 aligned in parallel are aligned to face the other three battery blocks 100 aligned in parallel, and the thus aligned six battery blocks 100 are accommodated in an insulating housing 300. The six battery blocks 100 are electrically connected to each other in series, an output of the battery module 10 is output outside the housing 300 via a positive electrode output terminal 400, and a negative electrode output terminal 500.

Figure 2:
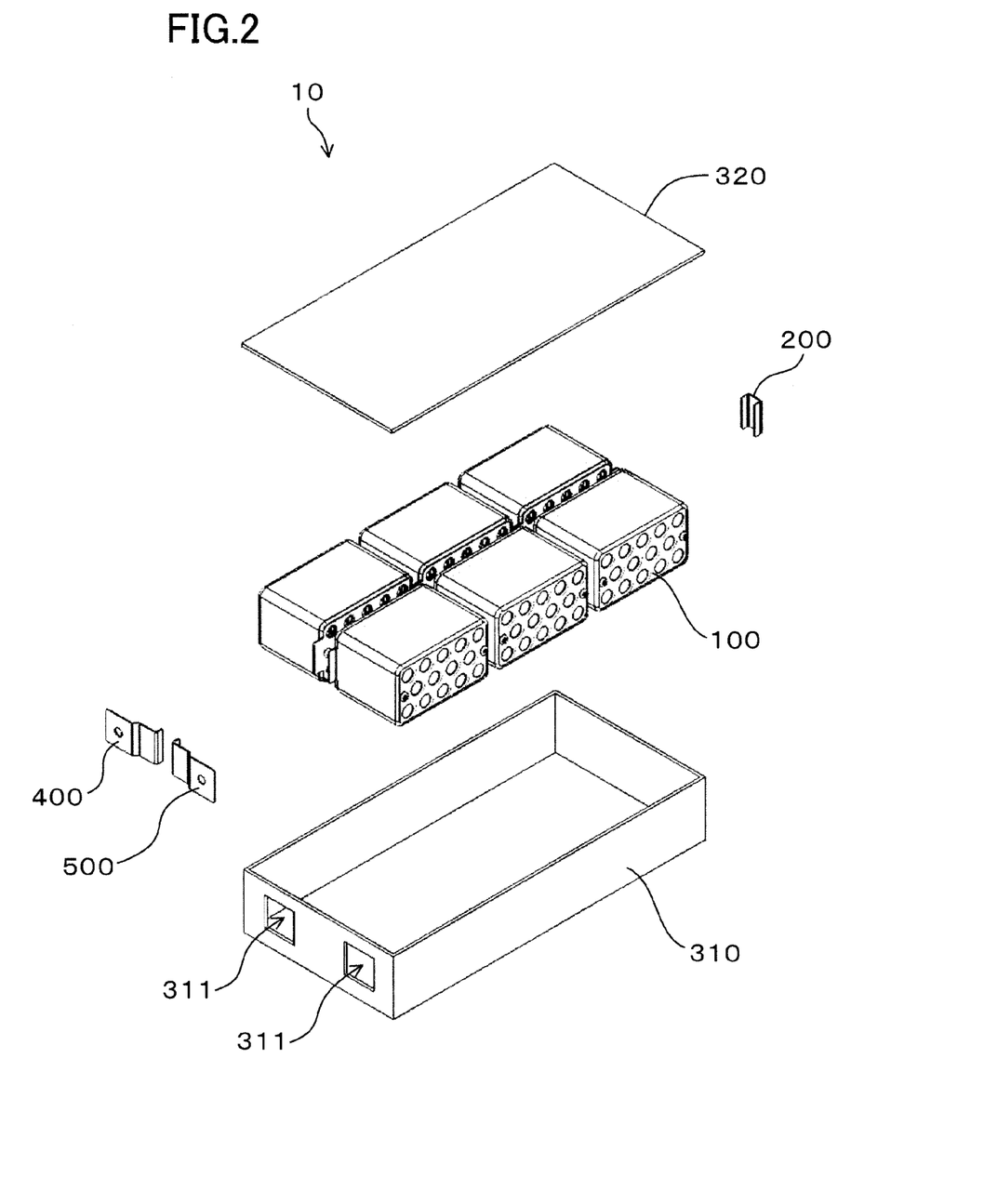
FIG. 2 is an exploded view illustrating the battery module of the embodiment of the present invention disassembled into components.

FIG. 2 is an exploded view illustrating the battery module 10 of the present embodiment disassembled into components.

As illustrated in FIG. 2, the three battery blocks 100 are connected to each other such that a connection terminal (not shown) of a first electrode (positive electrode) of a battery block 100 is connected to a connection terminal (not shown) of a second electrode (negative electrode) of an adjacent battery block 100. Ends of groups each of which includes the three battery blocks 100, and which face each other are connected to each other via a connection member 200. The thus connected six battery blocks 100 are accommodated in a lower case 310 of the housing 300, and sealed with a lid 320. Output terminal openings 311 are formed in the lower case 310. The positive electrode output terminal 400 connected to the connection terminals of the positive electrodes of the battery blocks 100 and the negative electrode output terminal 500 connected to the connection terminals of the negative electrodes of the battery blocks 100 are placed in the output terminal openings 311.

Figure 3:
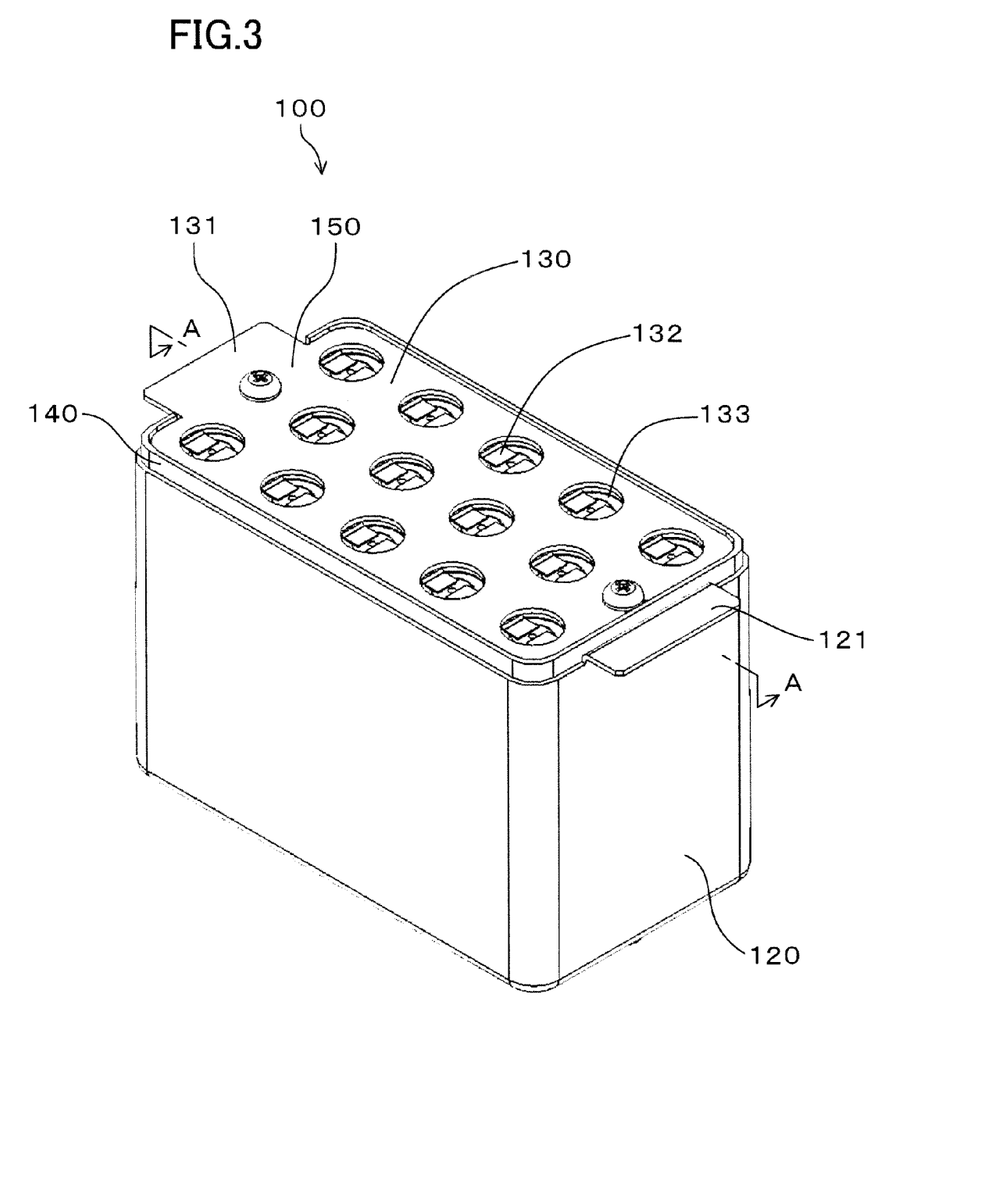
FIG. 3 is a perspective view schematically illustrating a configuration of the battery module of the embodiment of the present invention.
Figure 4:
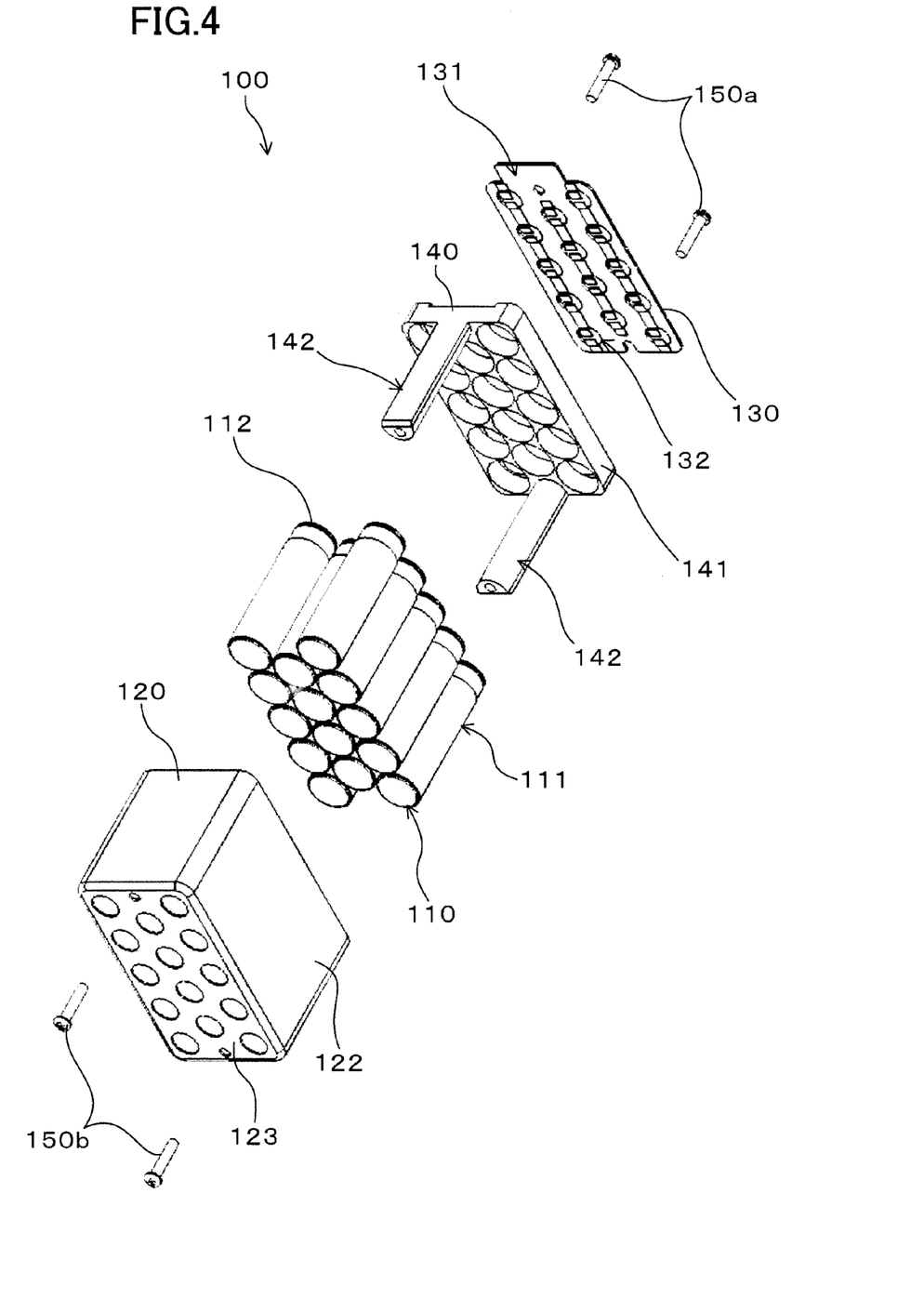
FIG. 4 is an exploded view illustrating the battery block of the embodiment of the present invention

FIG. 3 is a perspective view schematically illustrating a configuration of the battery block 100 of the present embodiment. FIG. 4 is an exploded view illustrating the battery block disassembled into components.

As illustrated in FIGS. 3, 4, the battery block 100 includes a plurality of cells 110 which are aligned with their positive electrodes being in the same direction, and are accommodated in a metal case 120 having a side surface 122 and a bottom surface 123. In the example illustrated in FIGS. 3, 4, fourteen cells 110 are aligned in a hexagonal lattice configuration with three rows which include five cells, four cells, and five cells, respectively.

Each cell 110 is a cylindrical secondary battery including a power-generating element accommodated in a cell case. Each cell 110 includes a positive electrode, and a negative electrode which is electrically insulated from the positive electrode, and also serves as the cell case of the cell 110.

The positive electrodes of the cells 110 are connected to a plate-like connector 130 arranged to face an opening of the metal case 120 via positive electrode lead plates 132. Note that in the connector 130, round holes 133 are formed at positions facing the positive electrodes of the cells 110. In areas where the round holes 133 are formed, the positive electrode lead plates 132 can be welded to the positive electrodes of the cells 110. Moreover, the negative electrodes (bottom surfaces of the cell cases) of the plurality of cells 110 are connected to the bottom surface 123 of the metal case 120. In this way, the plurality of cells 110 are electrically connected to each other in parallel.

With this configuration, a current from the negative electrode (cell case) can be output to the metal case 120 having a large cross-sectional area, so that it is possible to obtain a battery block 100 having small electrical resistance.

Here, the height of the side surface 122 of the metal case 120 is substantially the same as the height of the cells 110, and the opening of the metal case 120 is almost completely covered with the connector 130. With this configuration, the metal case 120 and the connector 130 substantially form the housing of the battery block 100, and protect the cells 110 accommodated in the battery block 100.

A shoulder portion of the cell case close to the positive electrode of each cell 110 is provided with an insulating spacer 112. Since the spacer 112 is provided between the cell case and the connector 130, short-circuiting between the positive electrode (connector 130) and the negative electrode (cell case) is prevented.

Moreover, the plurality of cells 110 are held by an insulating holder 140 accommodated in the metal case 120. The holder 140 includes a holding section 141 in which a plurality of cylinder portions are integrally formed. Outer side surfaces of the cells 110 are brought into contact with inner side surfaces of the cylinder portions of the holding section 141, so that the cells 110 are fixed by the holder 140. Note that the holder 140 holds the cells 110, and prevents short-circuiting between the positive electrode (connector 130) and the negative electrode (metal case 120).

Moreover, the holder 140 further includes fixing sections 142 extending along the side surface 122 of the metal case 120. The holder 140 is fixed to the bottom surface of the metal case 120 at one end of each fixing section 142 by a screw 150b. On the other hand, at the other end of each fixing section 142, the holder 140 is fixed to the connector 130 by a screw 150a.

Here, when the spacer 112 provided between the cell case of each cell 110 and the connector 130 is made of an elastic material (e.g., silicon lubber), the spacer 112 can serve as a cushion in fixing the cell 110 to the metal case 120 via the holder 140. In this way, for example, fixing the cells 110 can be ensured even when the cells 110 have a length tolerance and variations of their arrangement. Moreover, it is possible to alleviate vibration applied to the battery block 100.

Figure 5:
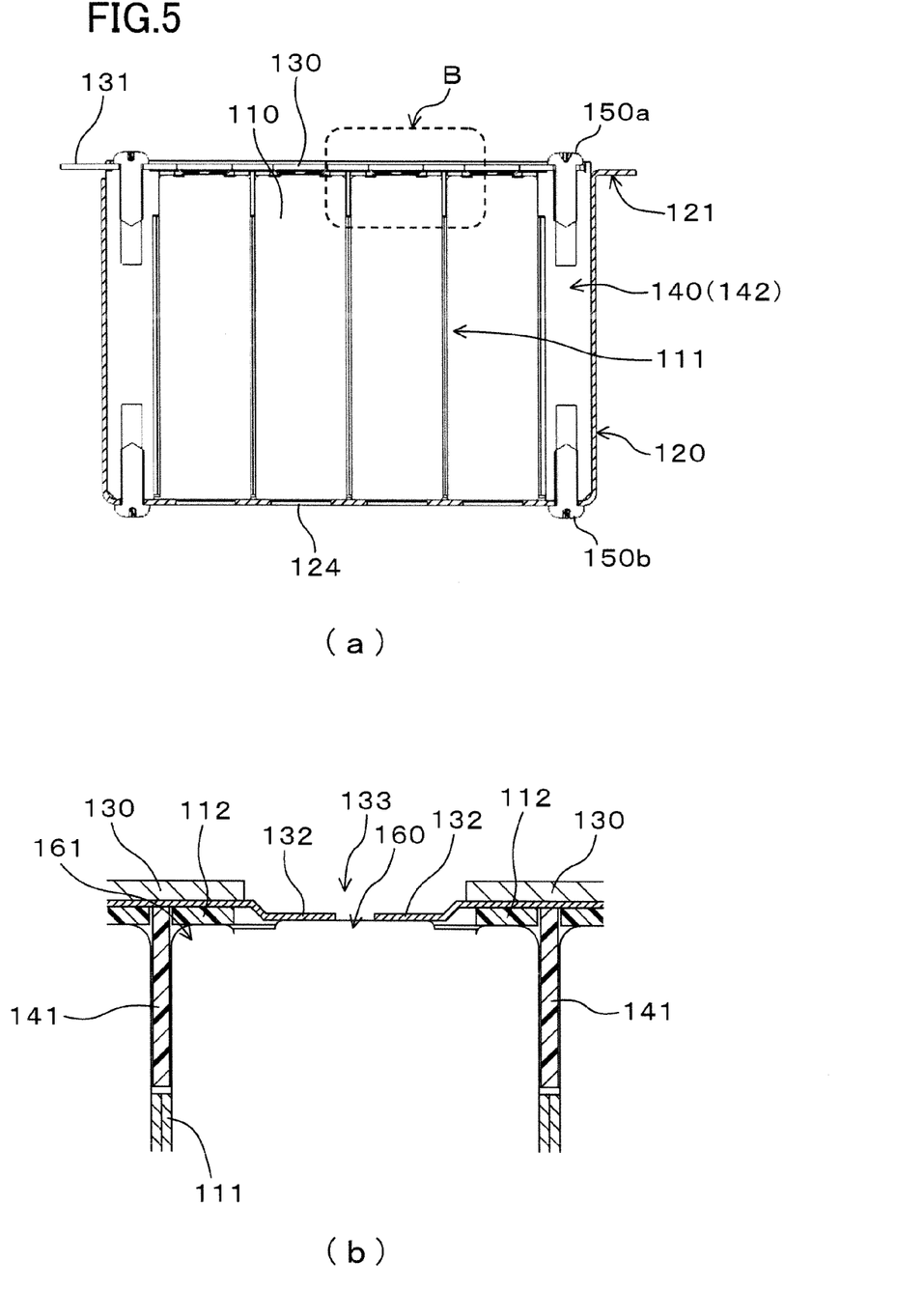
FIG. 5A is a cross-sectional view illustrating the battery block taken along the line A-A of FIG. 3.
FIG. 5B is an enlarged view of the part indicated by the arrow B of FIG. 5A.

FIG. 5A is a cross-sectional view taken along the line A-A of FIG. 3. FIG. 5B is an enlarged view illustrating a part indicated by the arrow B of FIG. 5A.

As illustrated in FIG. 5A, the connector 130 includes a positive electrode connection terminal (positive electrode external terminal) 131 outwardly extending beyond the side surface 122 of the metal case 120. The side surface 122 of the metal case 120 includes a negative electrode connection terminal (negative electrode external terminal) 121 at an end portion of the opening of the metal case 120 (at a side of the metal case 120 facing the connector 130). The negative electrode connection terminal 121 is outwardly bent to extend beyond the side surface 122 of the metal case 120. The positive electrode connection terminal 131 and the negative electrode connection terminal 121 are located at positions opposite to each other.

Figure 6:
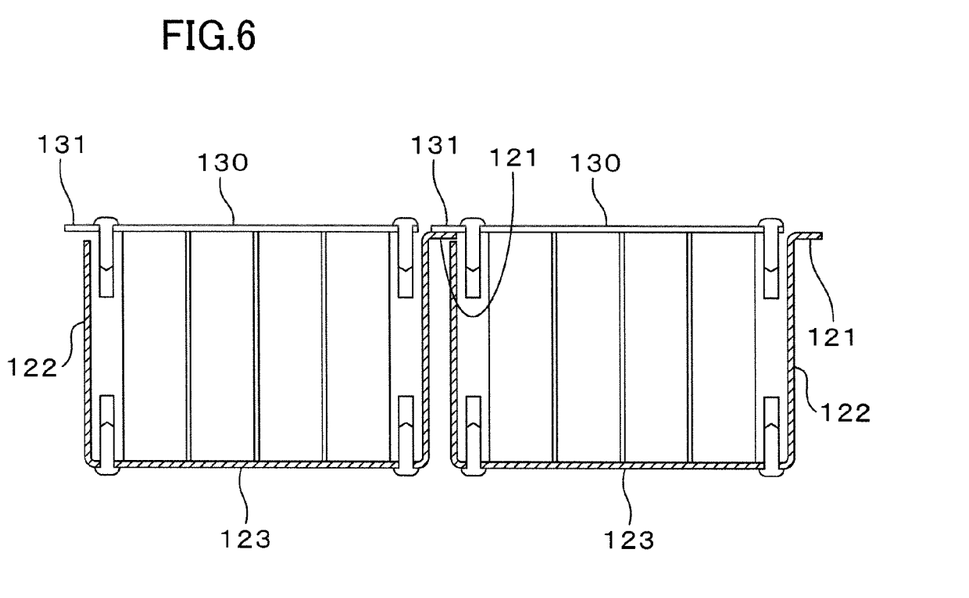
FIG. 6 is a view schematically illustrating a configuration of the battery module in which a plurality of battery blocks are aligned.

When the positive electrode connection terminal 131 and the negative electrode connection terminal 121 are provided in such positions, a plurality of battery blocks 100 aligned to configure a battery module can be easily connected to each other in series by bringing the positive electrode connection terminal 131 of a battery block 100 into contact with the negative electrode connection terminal of an adjacent battery block 100 as illustrated in FIG. 6.

Note that the positive electrode connection terminal 131 is not necessarily formed by outwardly extending the connector 130 beyond the side surface 122 of the metal case 120, but the connector 130 may extend in the periphery of the side surface 122 of the metal case 120 to such a position at which the connector 130 can be brought into contact with the negative electrode connection terminal 121 of the adjacent battery bock 100.

Moreover, as illustrated in FIG. 5B, a shoulder portion 161 of the cell case close to a positive electrode 160 of each cell 110 is provided with the insulating spacer 112. Since the spacer 112 is provided between the cell case and the connector 130, short-circuiting between the connector (positive electrode) 130 and the cell case (negative electrode) is prevented.

Moreover, as illustrated in FIGS. 4, 5B, the outer side surfaces of the cell cases of the cells 110 are covered with cylindrical heat transfer members 111. Adjacent ones of the cells 110 are aligned such that their heat transfer members 111 are in contact with each other, and outer ones of the cells 110 are aligned such that their heat transfer members 111 are in contact with the side surface of the metal case 120. With this configuration, heat generated in any one of the cells 110 is transferred to the adjacent cells 110, and is further transferred via the outer cells 110 to the metal case 120. Thus, the heat can be efficiently released. As the heat transfer member 111, a metal member is preferably used, examples of which include aluminum (thermal conductivity 236 W/(m·K)), silver (thermal conductivity 420 W/(m·K)), copper (thermal conductivity 398 W/(m·K)), gold (thermal conductivity 320 W/(m·K)), and the like.

Note that the spacer 112 and the holder 140 are individually formed in the present embodiment, but the spacer 112 and the holder 140 may be integrally formed. In this case, when the spacer 112 and the holder 140 are integrally made of an elastic member, vibration applied to the battery block 100 can be further alleviated.

Figure 7:
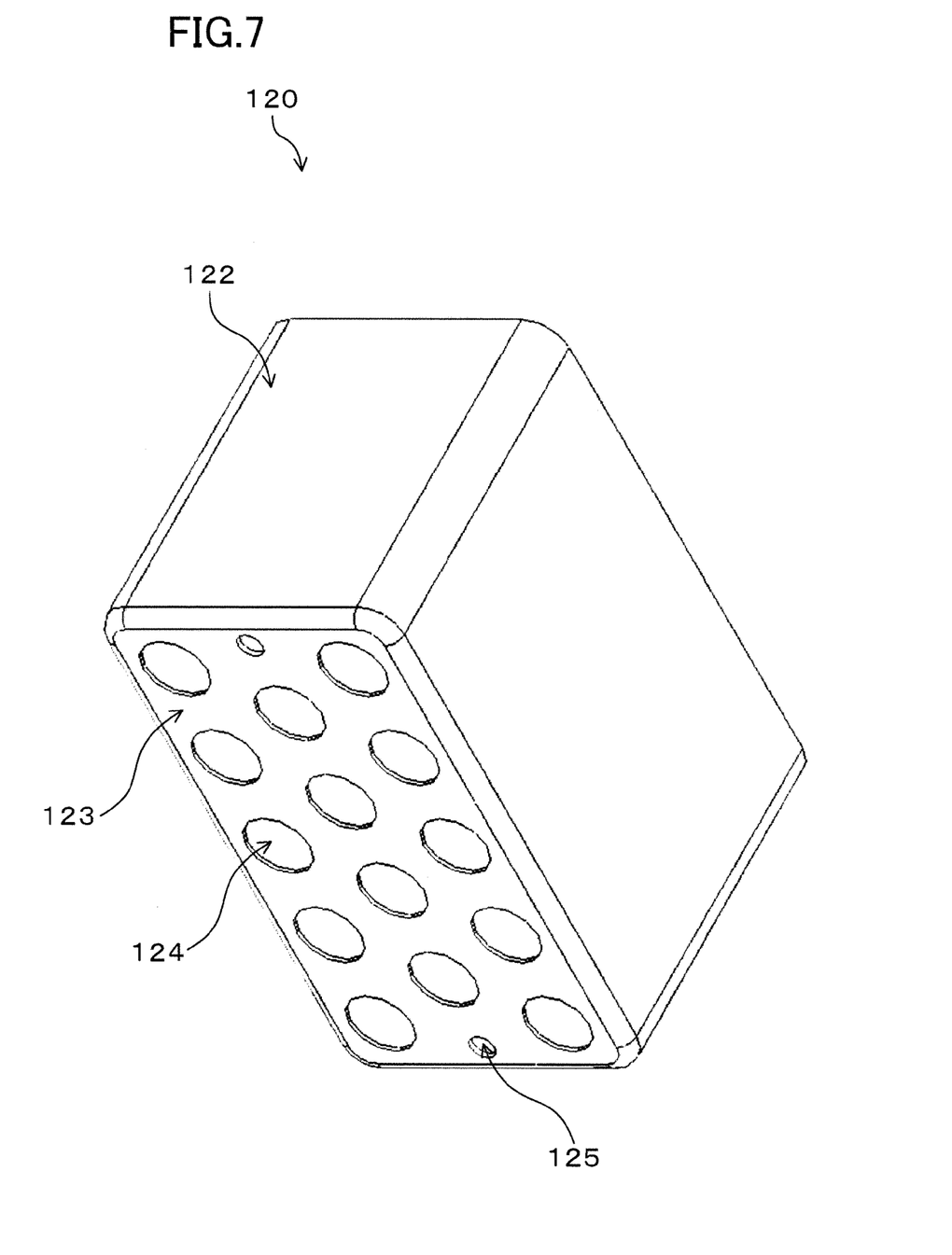
FIG. 7 is a perspective view of a metal case of the embodiment of the present invention.

FIG. 7 is a perspective view of the metal case 120 of the battery block 100 of the present embodiment.

As illustrated in FIG. 7, the metal case 120 includes the bottom surface 123 which is in contact with the cells 110, and the four-face side surface 122 having a height substantially equal to the height of the cells 100. The thickness of the metal case 120 is preferably larger than or equal to 1 mm in order to increase the cross-sectional area through which currents from the plurality of cells 110 flow. With this configuration, the area of the four-face side surface 122 is a conduction path of a current, and thus the electrical resistance can be small even when a large current flows. Therefore, heat generated at the metal case 120 is small, and power loss caused by the heat generation can be significantly reduced.

Moreover, the bottom surface 123 of the metal case 120 has a small thickness in areas 124 with which the bottom surfaces of the cell cases of the cells 110 are in contact. For example, the areas 124 can be recessed sections each of which has a size substantially equal to the contour size of the cell 110. Here, it is preferable that the thickness of the areas (recessed sections) 124 be substantially the same as the thickness of the cell case of the cell 110 (e.g., 0.2 mm-0.3 mm). With this configuration, the cells 110 can be easily welded to the metal case 120 by laser welding. Moreover, the bottom surface 123 of the metal case 120 is provided with screw holes 125 in order to fix the metal case 120 to the fixing sections 142 of the holder 140 by the screws 150b FIG. 8 is a view schematically illustrating the cell 110 of the present embodiment.

Figure 8:
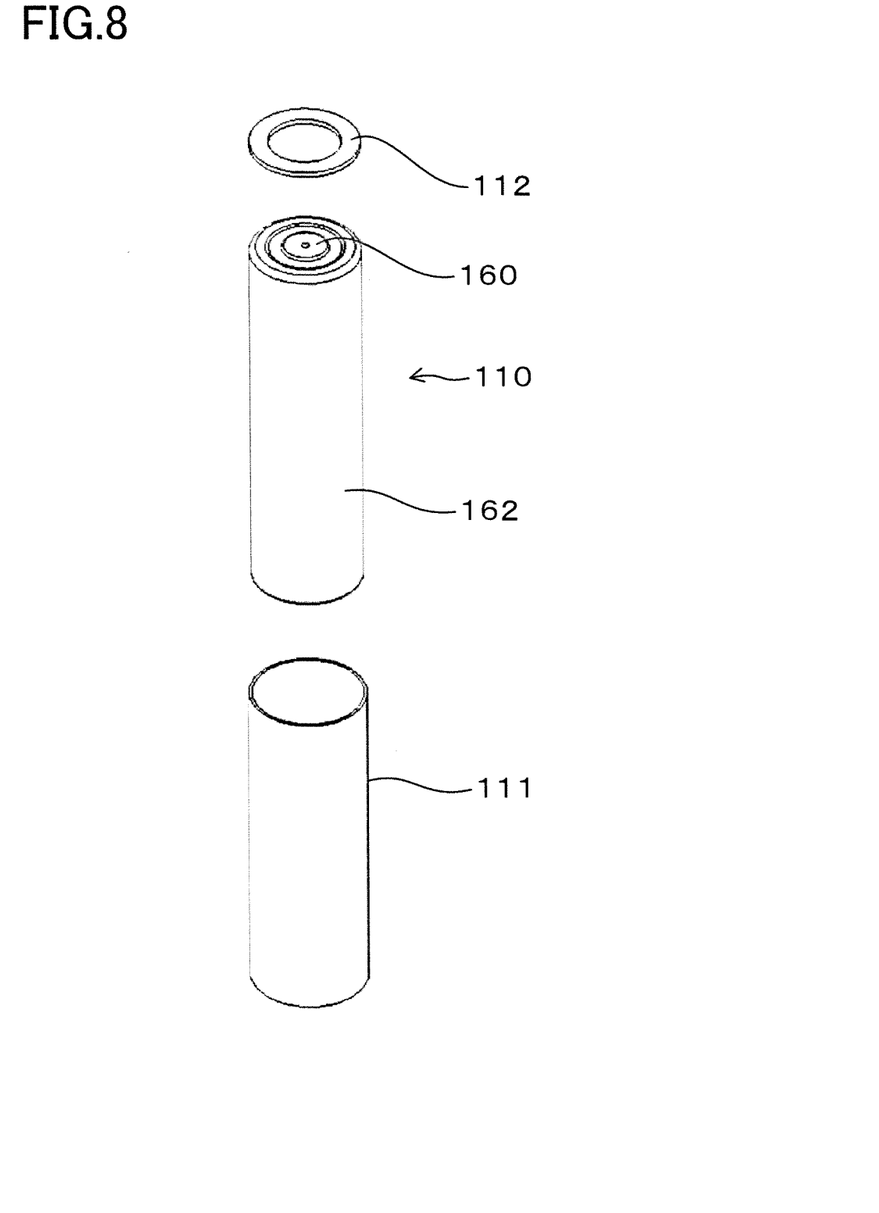
FIG. 8 is a view schematically illustrating the cell of the embodiment of the present invention.

As illustrated in FIG. 8, the cell 110 is surrounded by the heat transfer member 111 made of an aluminum pipe having a height substantially equal to the height of the cell 110. The spacer 112 made of silicon rubber is provided on a side close to the positive electrode 160 of the cell 110.

Figure 9:
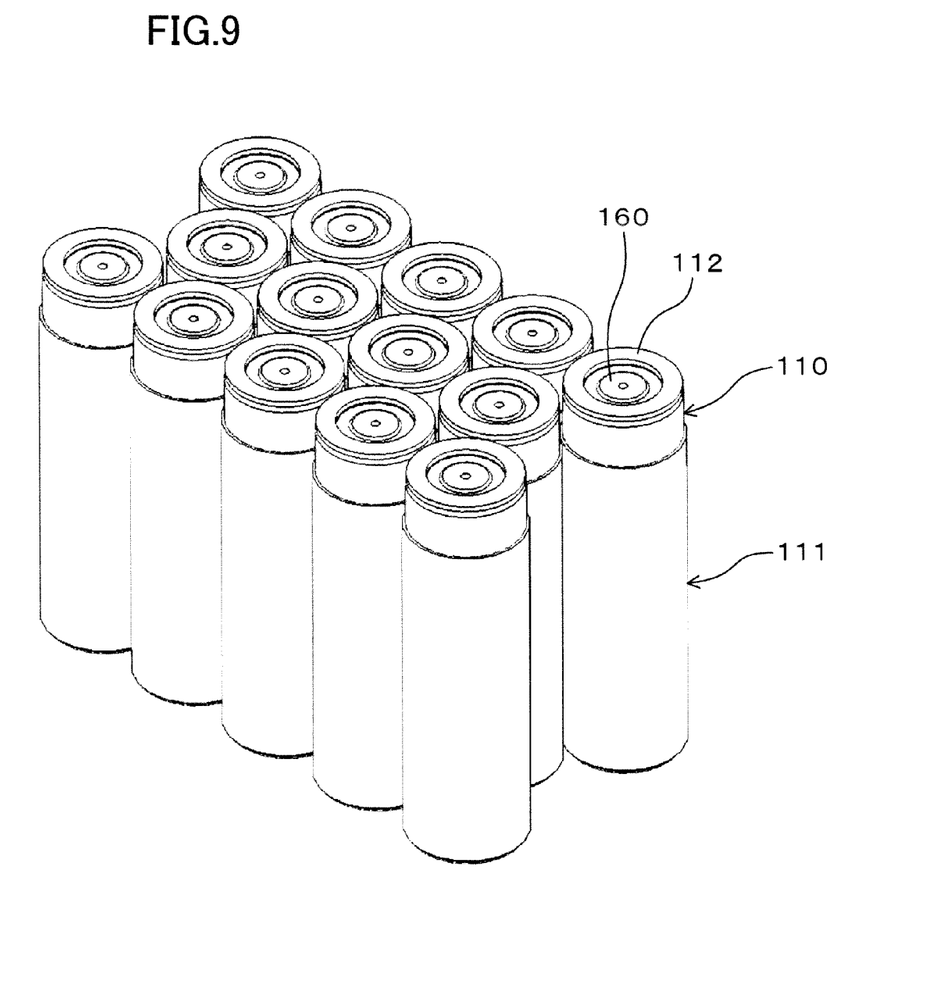
FIG. 9 is a perspective view illustrating an example alignment of the plurality of cells included in the battery block.

FIG. 9 is a perspective view illustrating an example of an alignment of the plurality of cells 110 included in the battery block 100.

As illustrated in FIG. 9, fourteen cells 110 are aligned in a hexagonal lattice configuration with three rows which include five cells, four cells, and five cells, respectively. Adjacent ones of the cells 110 are aligned such that their heat transfer members 111 are in contact with each other. When the plurality of cells 110 aligned in this way are accommodated in the metal case 120, the heat transfer members 111 of outer ones of the cells 110 are in contact with the side surface of the metal case 120. Thus, heat generated in any one of the cells 110 is transferred to the adjacent cells 110, and is further transferred via the outer cells 110 to the metal case 120. Therefore, the heat can be efficiently released.

Figure 10:
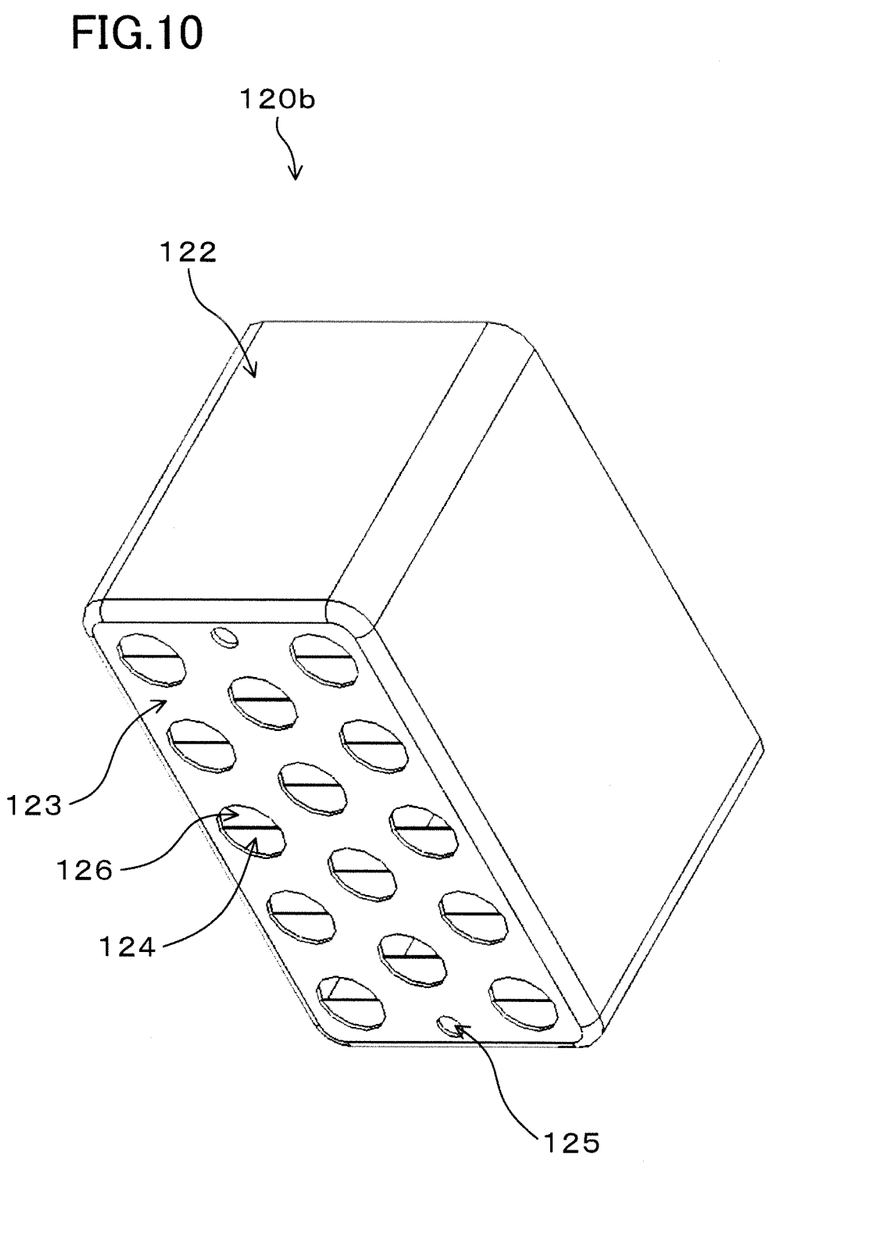
FIG. 10 is a perspective view illustrating a variation of the metal case.

FIG. 10 is a perspective view illustrating a variation of the metal case 120 of FIG. 7.

As illustrated in FIG. 10, a metal case 120b of the present variation includes semicircular recessed sections 124 and semicircular holes 126. With this configuration, an electrode for resistance welding can be brought into contact with cell cases of cells 110 through the holes 126. Thus, connection can be further ensured by performing the resistance welding of the cell cases to the metal case 120b.

Figure 11:
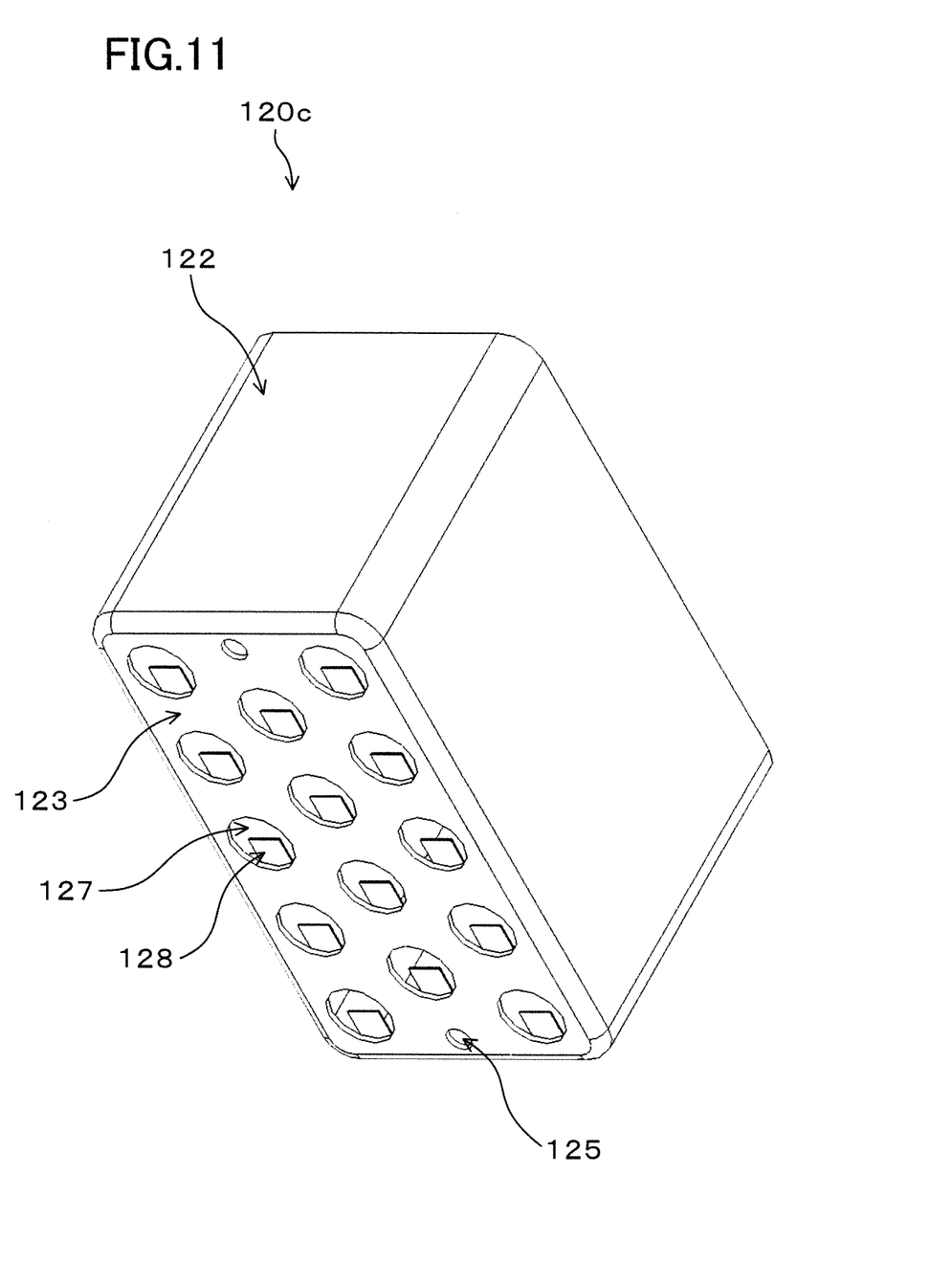
FIG. 11 is a perspective view illustrating another variation of the metal case.

FIG. 11 is a perspective view illustrating another variation of the metal case 120 of FIG. 7.

Figure 12:
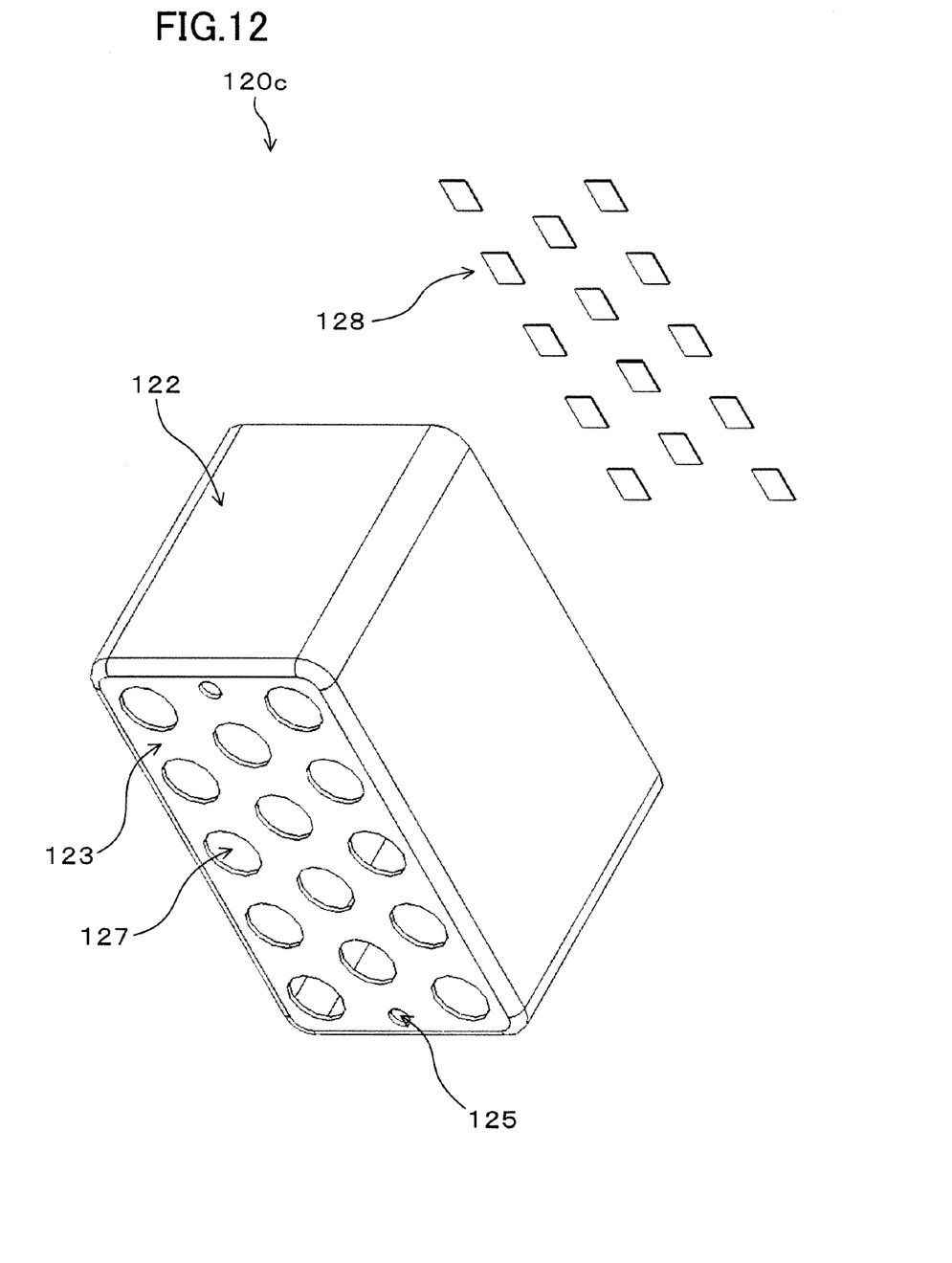
FIG. 12 is an exploded view of the metal case of FIG. 11.

As illustrated in 11, a metal case 120c of the present variation includes circular holes 127 formed in a surface in contact with negative electrodes (cell cases) of cells 110, and negative electrode lead plates 128 having a thickness of 0.2 mm-0.3 mm are provided in the circular holes 127. In this case, as illustrated in FIG. 12, fourteen circular holes 127 are formed in the metal case 120c, and the negative electrode lead plates 128 are arranged on the surface in contact with the cells 110. With this configuration, connection can be further ensured by performing the resistance welding with an electrode being in contact with the cell cases of the cells 110 and the negative electrode lead plates 128. Here, when the negative electrode lead plates 128 and the metal case 120c are individual members, suitable types of metal can be selected for the negative electrode lead plates 128 and the metal case 120c, and for example, nickel having good weldability may be selected for the negative electrode lead plates 128, and aluminum having good heat dissipation characteristics may be selected for the metal case 120c. Moreover, as the negative electrode lead plates 128, a two-layer clad plate made of nickel and aluminum may be selected.

Figure 13:
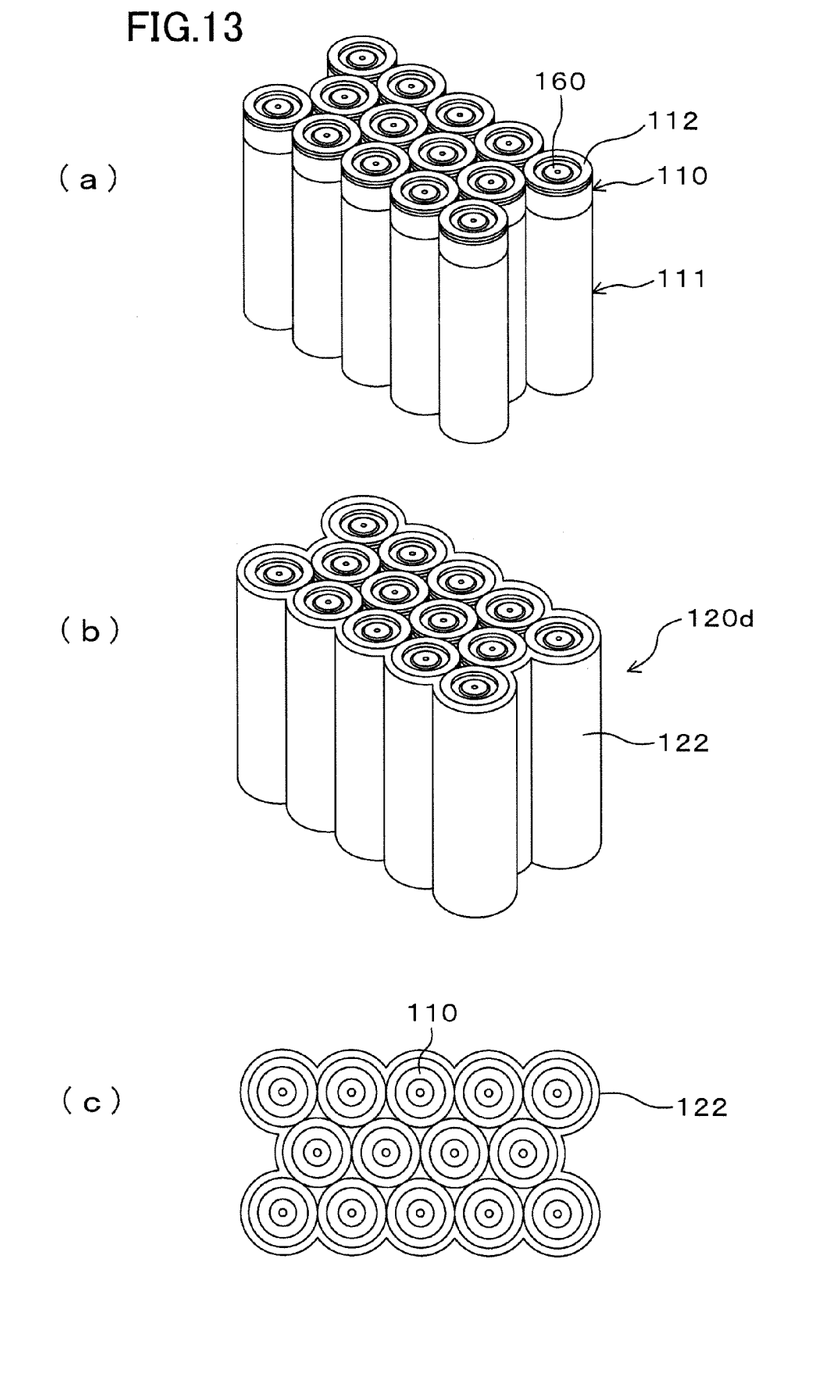
FIG. 13A is a perspective view illustrating an alignment of the cells.
FIG. 13B is a perspective view of the metal case.
FIG. 13C is a plan view of the metal case in which the cells are accommodated.

FIGS. 13A, 13B, 13C are views illustrating still another variation of the metal case 120 of FIG. 7, where FIG. 13A is a perspective view illustrating an alignment of cells 110, FIG. 13B is a perspective view illustrating a metal case 120d, and FIG. 13C is a plan view illustrating the metal case 120d in which the cells 110 are accommodated.

As illustrated in FIGS. 13B, 13C, the metal case 120d of the present variation includes a side surface 122 formed along outer side surfaces of cell cases of the cells 110. With this configuration, the entirety of the side surface 122 of the metal case 120d is in contact with the outer side surfaces of the cell cases of the cells 110 arranged outside. Thus, heat generated in the cell 110 can be further efficiently transferred to the metal case 120.

Although the present invention has been described above with reference to the preferable embodiments, the description is not intended to limit the invention, and of course, various modifications can be made. For example, in the above embodiment, the positive electrodes of the cells 110 are connected to the connector 130, and the negative electrodes (cell cases) of the cells are connected to the bottom surface of the metal case 120. However, the negative electrodes of the cells 110 may be connected to the connector 130, and the positive electrodes (cell cases) of the cells may be connected to the bottom surface of the metal case 120. Note that in this case, the cell cases of the cells 110 also serve as positive electrodes. Although the metal case 120 is rectangular in the above embodiment, the shape of the side surface 122 may be a polygon such as a hexagon, a circle, an ellipse, or the like when viewed from above.

INDUSTRIAL APPLICABILITY

The battery block of the present invention is useful to power sources having large electric capacitance capable of discharging a large current.

DESCRIPTION OF REFERENCE CHARACTERS

10 Battery Module
100 Battery Block
110 Cell
111 Heat Transfer Member
112 Spacer
120, 120b, 120c, 120d Metal Case
121 Negative Electrode Connection Terminal
122 Side Surface
123 Bottom Surface
124 Area (Recessed Section)
125 Screw hole
126 Hole
127 Round Hole
128 Negative Electrode Lead Plate
130 Connector
131 Positive Electrode Connection Terminal
132 Positive Electrode Lead Plate
133 Round Hole
140 Holder
141 Holding Section
142 Fixing Section
150a, 150b Screw
160 Positive Electrode
200 Connection Member
300 Housing
310 Lower Case
311 Output Terminal Opening
320 Lid
400 Positive Electrode Output Terminal
500 Negative Electrode Output Terminal

The invention claimed is:

1. A battery block comprising:
a metal case including a side surface and a bottom surface; and
a plurality of cells accommodated in the metal case, wherein
each cell includes a first electrode and a second electrode which is electrically insulated from the first electrode, and also serves as a cell case of the cell,
the plurality of cells are aligned with the first electrodes being in a same direction,
the first electrodes of the plurality of cells are connected to a connector arranged to face an opening of the metal case, and
the second electrodes of the plurality of cells are connected to the bottom surface of the metal case.

2. The battery block of claim 1, wherein
an insulating spacer is provided between the connector and a shoulder portion of the cell case close to the first electrode of each cell.

3. The battery block of claim 2, wherein
the spacer is made of an elastic member.

4. The battery block of claim 1, wherein
the plurality of cells are held in an insulating holder accommodated in the metal case,
the holder includes a plurality of integrally formed cylinder portions, and
outer side surfaces of the cells are in contact with and are fixed to inner side surfaces of the cylinder portions.

5. The battery block of claim 4, wherein
the holder further includes a fixing section extending along the side surface of the metal case, and
the holder is fixed to the bottom surface of the metal case at one end of the fixing section.

6. The battery block of claim 5, wherein
the holder is fixed to the connector at the other end of the fixing section.

7. The battery block of claim 4, wherein
an insulating spacer is provided between a shoulder portion of the cell case close to the first electrode of each cell and the connector, and
the holder is integrally formed with the spacer.

8. The battery block of claim 1, wherein
the connector includes a first connection terminal extending in a periphery of the side surface of the metal case,
the side surface of the metal case includes a second connection terminal at an end portion of the opening of the metal case, the second connection terminal being outwardly bent to extend beyond the side surface of the metal case, and
the first connection terminal and the second connection terminal are located at positions opposite to each other.

9. The battery block of claim 1, wherein
outer side surfaces of the cell cases of the cells are covered with cylindrical heat transfer members,
adjacent ones of the cells are aligned such that the heat transfer members thereof are in contact with each other, and outer ones of the cells are aligned such that the heat transfer members thereof are in contact with the side surface of the metal case.

10. The battery block of claim 9, wherein the heat transfer member is made of a metal member.

11. The battery block of claim 1, wherein bottom surfaces of the cell cases of the cells are welded to the bottom surface of the metal case.

12. The battery block of claim 11, wherein the bottom surface of the metal case has a small thickness in areas with which the bottom surfaces of the cell cases of the cells are in contact.

13. The battery block of claim 11, wherein holes are formed in the areas with which the bottom surfaces of the cell cases of the cells are in contact.

14. The battery module comprising:
multiple ones of the battery block of claim 8 accommodated in an insulating housing, wherein
the first connection terminal of the battery block is in contact with and is connected to a second connection terminal of an adjacent battery block in series.

15. The battery block of claim 1, wherein a height of the side surface of the metal case is substantially the same as a height of the cells.

16. The battery block of claim 15, wherein the opening of the metal case is almost completely covered with the connector.

17. The battery block of claim 1, wherein the opening of the metal case is almost completely covered with the connector.

* * * * *